US010218769B2

(12) United States Patent
Raabe et al.

(10) Patent No.: US 10,218,769 B2
(45) Date of Patent: Feb. 26, 2019

(54) MONITORING DIGITAL IMAGES ON MOBILE DEVICES

(71) Applicant: Conrad Management Corporation, Westlake Village, CA (US)

(72) Inventors: Bruce Raabe, Corona, CA (US); Gerald Conrad, Fort Lauderdale, FL (US)

(73) Assignee: Conrad Management Corporation, Westlake Village, CA (US)

( * ) Notice: Subject to any disclaimer, the term of this patent is extended or adjusted under 35 U.S.C. 154(b) by 88 days.

(21) Appl. No.: 15/175,538

(22) Filed: Jun. 7, 2016

(65) Prior Publication Data

US 2016/0359948 A1 Dec. 8, 2016

Related U.S. Application Data

(60) Provisional application No. 62/172,404, filed on Jun. 8, 2015.

(51) Int. Cl.
*H04W 4/60* (2018.01)
*H04L 29/08* (2006.01)
*H04M 1/725* (2006.01)
*G06K 9/00* (2006.01)

(52) U.S. Cl.
CPC ........... *H04L 67/025* (2013.01); *H04L 67/02* (2013.01); *H04L 67/10* (2013.01); *H04L 67/125* (2013.01); *H04L 67/18* (2013.01); *H04L 67/20* (2013.01); *H04L 67/22* (2013.01); *H04L 67/26* (2013.01); *H04M 1/72525* (2013.01); *H04W 4/60* (2018.02); *G06K 9/00288* (2013.01)

(58) Field of Classification Search
CPC ....... H04L 67/025; H04L 67/02; H04L 67/22; G06K 9/00288; G06K 9/00295
USPC .................................................. 455/418-420
See application file for complete search history.

(56) References Cited

U.S. PATENT DOCUMENTS

| 2003/0126267 A1* | 7/2003 | Gutta | G06F 17/30867 709/229 |
|---|---|---|---|
| 2006/0045245 A1* | 3/2006 | Aaron | H04M 15/73 379/111 |
| 2010/0267361 A1* | 10/2010 | Sullivan | G01S 19/17 455/404.2 |
| 2011/0047388 A1* | 2/2011 | Park | G06F 21/6209 713/189 |
| 2011/0065419 A1* | 3/2011 | Book | G06F 21/305 455/411 |
| 2012/0151047 A1* | 6/2012 | Hodges | G06F 21/604 709/224 |

(Continued)

*Primary Examiner* — Marisol Figueroa
(74) *Attorney, Agent, or Firm* — Socal IP Law Group LLP; Nikki M. Dossman; Mark A. Goldstein

(57) ABSTRACT

Methods and systems for monitoring digital pictures and videos on mobile devices are described herein. A method for monitoring digital images on mobile devices includes receiving a designation of a target device and monitoring settings for the target device via a monitoring application on a monitoring device. The monitoring settings are sent to a target application on the target device, and target device information based on the monitoring settings is received from the target application, where the target device information includes digital image information. The target device information is sent to the monitoring device.

18 Claims, 8 Drawing Sheets

(56) References Cited

U.S. PATENT DOCUMENTS

2013/0332518 A1* 12/2013 Chor ................... H04L 67/42
709/203
2015/0032887 A1* 1/2015 Pesek .................. G06F 21/305
709/224

* cited by examiner

© 2016 Conrad Management Corp.

MONITORING DIGITAL IMAGES ON MOBILE DEVICES

RELATED APPLICATION INFORMATION

This patent application claims priority from Provisional Patent Application No. 62/172,404 filed Jun. 8, 2015 which is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND

Field

The disclosure relates to monitoring of digital images, including pictures and videos, on mobile devices.

Description of the Related Art

Mobile telephones are now ubiquitous in our society. The number of mobile devices, including mobile phones, in the hands of minors is increasing yearly. Current smart phones are like small computers and are geared for accessing the Internet and social media. Cameras on these smart phones are a big selling point as pictures and videos are a driving force behind the social media rage. Unlike computers, smart phones are always with the child and can be accessed anywhere at any time.

Children, and in particular teenagers, often use smart phones in an unsupervised manner. Because children and teenagers generally do not consider the impact of a picture or video in the long term, there is an epidemic of inappropriate and/or embarrassing pictures and videos being taken, received, and shared with their peers. Since taking, receiving and sending pictures and videos is a daily occurrence with children and teenagers, they are desensitized as to what is appropriate use of mobile device cameras. They may believe that once they delete a picture it is gone. Children and teenagers do not realize that once a picture has been posted online or sent to their peers it may pass into cyberspace, never to be recovered or retrieved from public view. Lacking appropriate inhibition that comes from experience, children and teenagers use cameras on mobile devices to take and share pictures and videos everywhere, every day, without any thought of the consequences.

DETAILED DESCRIPTION OF THE INVENTION

A method of and system for monitoring digital images, including pictures and video, is described herein. In one version, the method enables a mobile device user to monitor digital images on another mobile device. Throughout this description, the embodiments and examples shown should be considered as exemplars, rather than limitations on the apparatus and methods described.

The methods described herein enable parents to monitor digital images and video captured by their children. This monitoring is achieved via applications for mobile phones and tablets, such as IPHONE, IPAD, and ANDROID devices. The method deters teens and children from taking, receiving, keeping, or sending inappropriate pictures and videos on their phones and through social media. The applications allows parents to parent and be informed of pictures and videos their child is taking, receiving, and sharing.

When a picture or video is taken or received on the mobile device of a child, a child's target application on the child's device copies the picture and uploads it to a third-party cloud-based location or website accessible to the child's parents, for example, Google Drive, Dropbox, iCloud, Amazon Simple Storage Service (S3) and the like, or a cloud storage service made available by the application provider. The system may optionally send an alert to the parent via the parent's monitoring application, email or mobile message, notifying the parent of the availability of new pictures or videos captured by their child. The system causes the pictures and videos to be stored for a suitable period (e.g., 5, 10, 30 or 60 days, which can be automatically selected or selected by the parent) and automatically deleted after the period to avoid large memory requirements. Parents can log on to their monitoring application as often as they like to quickly view the pictures and videos taken by or sent to their child. Other information, such as the location of the mobile device and application and Internet usage on the mobile device, can also be sent to the parent.

The system does not avoid inappropriate pictures, but rather deters them and holds the child accountable so the child can learn how to use mobile devices appropriately. If children or teens know their parents can view pictures and videos taken or received, the system acts as a deterrent from inappropriate or embarrassing behavior.

The target application is downloaded on the child's phone and set up with a password to prevent the child from accessing or deleting the application. In one embodiment, if the target application is deleted, and/or if a certain number of attempts to access the target application are unsuccessfully made, the camera on the child's device is disabled, depriving the child access to the camera of the mobile device.

Figure 1:
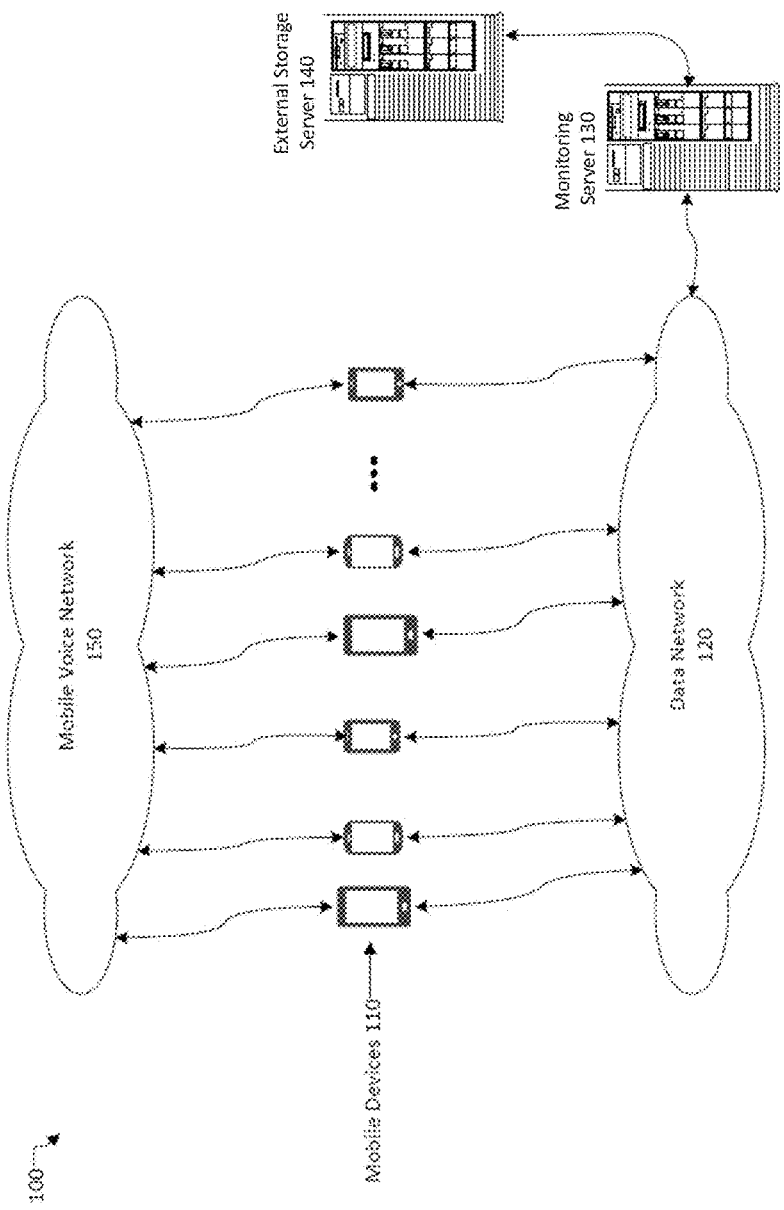
FIG. 1 is a block diagram of a system topology.

Referring now to FIG. 1, a block diagram of a system topology 100 is shown. The system topology 100 includes mobile devices 110, a data network 120, a monitoring server 130, an external storage server 140, and a mobile voice network 150. The mobile devices 110 are mobile telephones and computing tablets. The mobile devices 110 have the ability to communicate via one or both of the data network 120 and mobile voice network 150. The mobile devices 110 run an operating system such as, for example, ANDROID from GOOGLE. or iOS from APPLE INC. The mobile devices 110 have a touch screen interface supported by the operating system for receiving user input and displaying information such as graphics and text to the user. The touch screen is used as both an input device and an output device. The mobile devices 110 include a processor and memory, such as, for example, random access memory (RAM), storage memory, and may include a graphics processor and/or an audio processor.

The mobile devices 110 include multiple hardware features. The hardware features include radios, transmitters, transceivers, antennas and electronic chips and firmware that enable the mobile devices to communicate over data network 120 and the mobile voice network 150. The hardware features also include one or more audio speakers to emit sound, one or microphones to capture sound, and one or more cameras to capture photographs and video. The operating system on the mobile devices provides software support to applications and enables the applications to access the hardware features of the mobile devices. Pertinent to the methods and systems described herein is that the operating system allows applications to access the location-determining systems, the storage memory, the camera, and digital images stored on the mobile devices.

The mobile devices 110 support voice and data communications according to multiple communications standards. Voice calls have historically been placed by connections to a cellular telephone network (such as the Global System for Mobile Communications (GSM) and code division multiple access (CDMA) networks) that is coupled with and communicates with other mobile devices and telephones over the public switched telephone network (PSTN). The mobile devices provide data communications capabilities using multiple protocols including, for example, General Packet Radio Service (GPRS), Enhanced Data rates for GSM Evolution (EDGE), High-Speed Downlink Packet Access (HSDPA), Dual Cell HSDPA (DC-HSDPA), High-Speed Uplink Packet Access (HSUPA), Universal Mobile Telecommunications System (UMTS), Wideband Code Division Multiple Access (WCDMA), Enhanced Voice-Data Optimized (Ev-DO), Long-Term Evolution (LTE), Time-division Long-Term Evolution (TD-LTE), Long-Term Evolution Time-Division Duplex (LTE TDD), and WiFi.

The data network 120 supports communications in various protocols (such as those named in the prior paragraph as well as others) over various media, including wired and wireless. The data network 120 is packet-switched and may comprise one or more public and/or private data networks, and other networks and sub-networks and may include or be the Internet.

The monitoring server 130 (e.g., a mobile device management server) and the external storage server 140 may be one or more servers that include a processor, memory, a communications interface (which may be one or more network interface cards (NICs) or devices) and storage devices. As used herein, storage devices are hard disk drives (HDDs) and silicon storage devices (SSDs) and include magnetic media and flash or solid state memory. The monitoring server 130 runs an operating system, such as, for example, a version of the MICROSOFT WINDOWS operating system, LINUX, UNIX, APPLE MAC OS. Although only one each of monitoring server 130 and the external storage server 140 are shown, the monitoring server 130 and the external storage server 140 may be and may represent multiple servers. The monitoring server 130 and the external storage server 140 may each be a group of servers, network capable storage devices, routers, switches, gateways and other communications devices. The monitoring server 130 and the external storage server 140 may each be coupled with or communicate over data network 120.

The software that implements the methods described herein runs as a monitoring system on monitoring server 130 and as applications, a monitoring application or a target application, on the mobile devices 110. The monitoring system is stored on storage media included in or accessible to monitoring server 130. The monitoring application or the target application on the mobile devices 110 is stored on memory included in the mobile devices.

The external storage server 140 stores digital image files and other information, such as location, application, and Internet history information. There may be multiple external storage servers. The external storage server, in one instance, is maintained as a cloud-based location or website, such as Google Drive, Dropbox, iCloud, Amazon Simple Storage Service (S3) and the like. Other external storage servers may be private servers.

The monitoring server 130 maintains information, such as settings information, facial recognition information, digital image information, location information, Internet usage information, and application usage information it makes accessible to users of the monitoring application on mobile devices. The monitoring server 130 may include one or more databases to store the information recited in the prior sentence. The information stored in the monitoring server 130 may be limited to a certain size based on the number and size of storage devices included in our coupled with the monitoring server. The monitoring server 130 communicates with the external storage server 140 over the Internet to access additional (or excess) information which may be on an external storage server 140 or other third party controlled servers. Although shown as a single server in FIG. 1, monitoring server 130 may be a combination of multiple servers.

Figure 2:
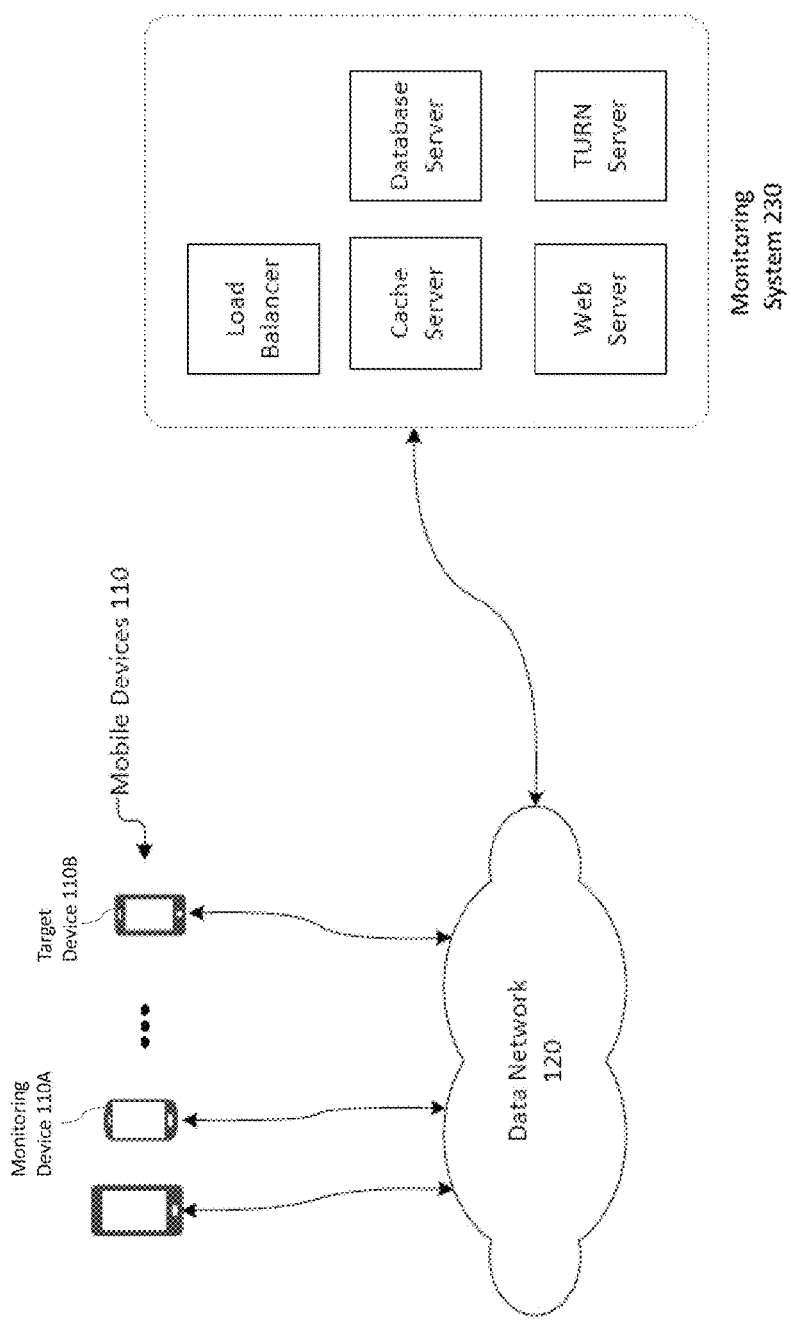
FIG. 2 is a block diagram of a device environment.

FIG. 2 is a block diagram of a device environment in which the monitoring server 130 is implemented using multiple devices in a monitoring system 230. The monitoring system 230 may include one or more of each of some or all of a web server, a database server (which may support the structured query language (SQL) or variants thereof), a TURN (Traversal Using Relay NAT) server, a load balancer, a cache server, a and others. The monitoring system 230 can communicate with mobile devices 110, including a monitoring device 110A via a monitoring application and a target device 110B via a target application. Additional devices are not shown but may be included as part of the monitoring system 230.

Figure 3:
FIG. 3 is a flow chart showing monitoring of digital images on mobile devices.

FIG. 3 is a flow chart of a process of monitoring digital images, including pictures and videos, and other information on mobile devices. A monitoring application and a target application can be developed for various mobile device platforms (e.g., ANDOID and iOS) and distributed through the established ANDROID and APPLE app ecosystems. Initially, the monitoring application is downloaded and installed on one or more monitoring devices (e.g., mobile phone or tablets) by a parent user, as shown in block 302. This is achieved by downloading and installing the monitoring application from GOOGLE'S PLAY STORE, APPLE'S APP STORE, the AMAZON APPSTORE for ANDROID at AMAZON.COM, or another mobile device application source. The monitoring application can be downloaded and installed by a parent, guardian, caregiver, teacher, employer or other party interested in monitoring use of a mobile device of a child, student, dependent, disabled person, employee or other user.

Once the parent user has installed the monitoring application, the parent user can create an account and register for monitoring services via the monitoring application on the monitoring device, as shown in block 304 of FIG. 3. Referring now to the mobile device screen capture shown in FIG. 4A, the monitoring application provides the parent user a signup interface 400A can include text entry boxes for the parent user's first name 402, last name 404, mobile number 406, and email 408. The sign up interface 400A can also include a text entry box for a pin (or password) 410, which can either be a user-selected pin or a system assigned pin of suitable length (e.g., 6 characters). Optionally, a pin confirmation screen can be displayed, where the user can confirm the accuracy of the initial pin entry, or a user name selection text box can be displayed, where the user can select a user name. Other user identifying information and/or demographic information may be required to create an account and use the monitoring application. Agreement to terms of service may be required as a prerequisite to using the monitoring service, and this may be achieved during the registration process by the monitoring application providing the user a check box, radio button or other user interface item to signify acceptance to a terms of service provided via the monitoring application. The account information is sent to the monitoring system, which can then send a response validating the user. The parent user can select a continue icon 412 to submit the entered information to the monitoring server, and the monitoring server receives the entered information and uses this information to create the parent user's account.

The monitoring application could additionally allow the user to sign in with a social media application, such as Facebook. The monitoring system can send a request to Facebook to retrieve the parent user's information and use this information to create the parent user's account.

Figure 4B:
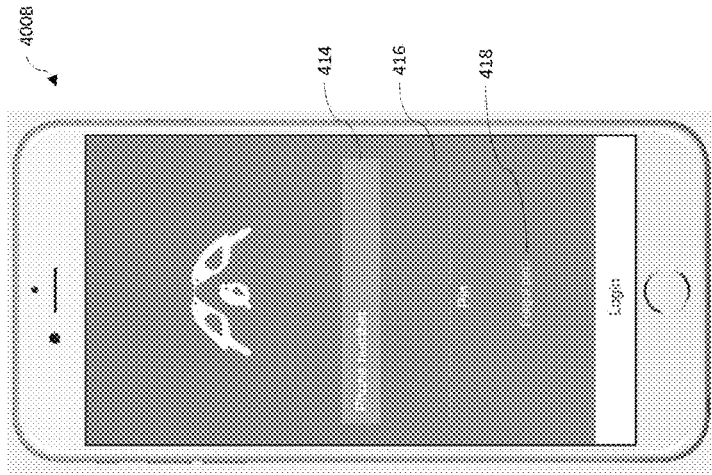
FIG. 4B is a mobile device screen capture showing a login interface of a monitoring application.
Figure 4A:
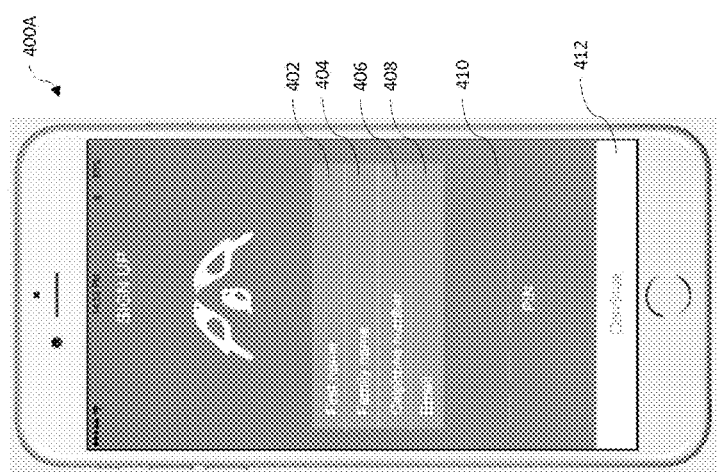
FIG. 4A is a mobile device screen capture showing a sign up interface of a monitoring application.

Referring now to FIG. 4B, after registration and upon opening the monitoring application for regular use, the monitoring application provides the parent user with a simplified start screen with a login interface 400B. The login interface 400B can include text entry boxes for a mobile number 414, or other suitable user name, and the pin 416. The login interface 400B can also include a forgotten pin retrieval icon 418 for the user to select if the pin is forgotten and a login icon 420 for the user to select to proceed to using the monitoring application.

Optionally, the monitoring application can include a tutorial to guide the parent user as to how to operate the monitoring application and demonstrate its main functionalities. The user may "swipe" through the tutorial or choose to skip the tutorial. The tutorial can be automatically displayed when the monitoring application is opened after initial installation. The tutorial may also be accessed later by the user through the monitoring application if the user desires to learn more about the monitoring application or feels a refresher of the functionalities is desired.

Figure 5C:
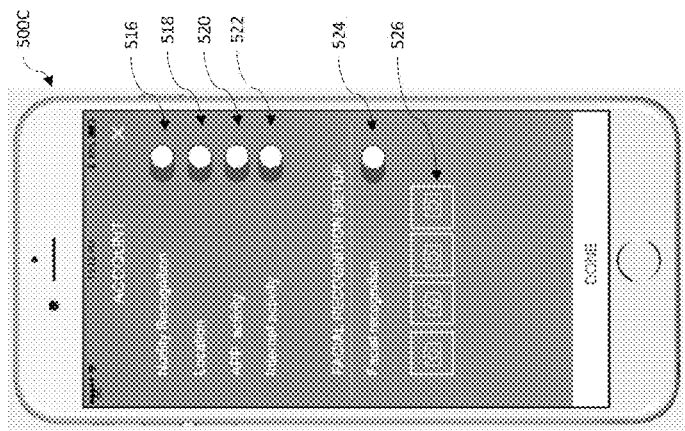
FIG. 5C is a mobile device screen capture showing a target device settings interface of a monitoring application.
Figure 5B:
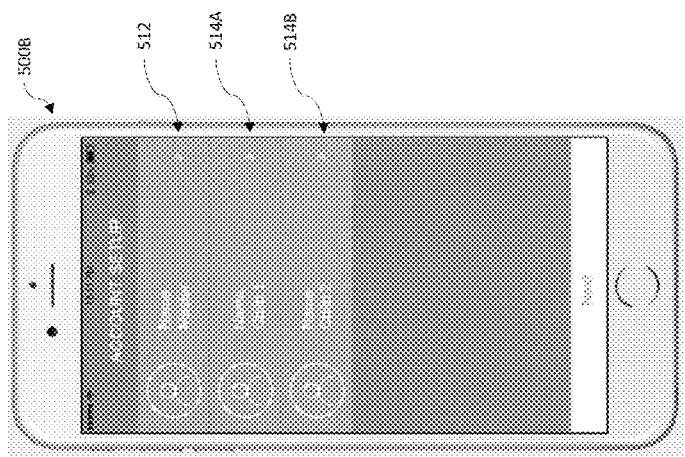
FIG. 5B is a mobile device screen capture showing an account setup interface of a monitoring application.
Figure 5A:
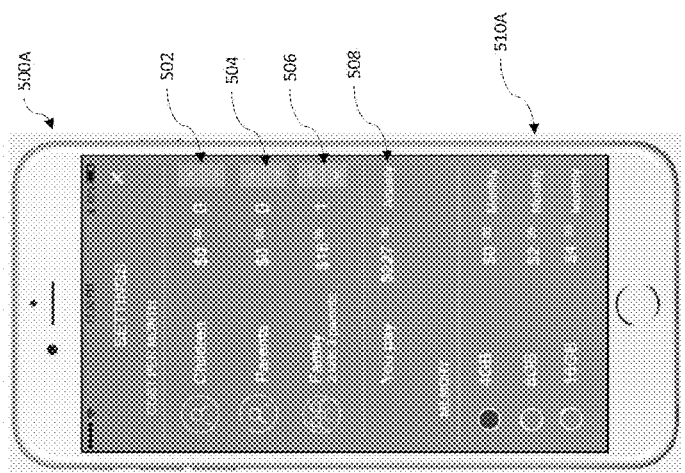
FIG. 5A is a mobile device screen capture showing a settings interface of a monitoring application.

Referring now to the mobile device screen capture shown in FIG. 5A, the monitoring application can provide a settings interface 500A that allows the parent user to make purchases of features and storage within the application. Initially, the parent user can download and install the monitoring applications without paying a fee. Once the application has been installed, the parent user can purchase a desired monitoring service plan, such as by designating the number of children's target devices that will be monitored for a certain price 502, designating the number of parent's monitoring devices that will be used for a certain price 504, designating a family plan with a specified number of devices for a certain price 508, and/or designating an amount of memory storage available for use with the account for a certain price 510. The monitoring system receives the parent's selection of number and designation of parent devices, number and designation of target devices, and the amount of memory desired, as shown in block 306 of FIG. 3. The purchase of products can be conducted and confirmed through an online application sales service, such as GOOGLE'S PLAY STORE, APPLE'S APP STORE, AMAZON.COM APPSTORE for ANDROID, or another mobile device application source. The user can also view previous orders, membership history, and payment history via the monitoring application.

Referring now to the mobile device screen capture of FIG. 5B, the monitoring application includes an account setup interface 500B, which displays all of the licenses purchased, including parent (monitoring) and child (target) licenses, and allows the parent user to enter set up information for each license. The parent user can enter set up information for the monitoring application on one or more monitoring devices by selecting the monitoring device 512. The parent user can also enter setup information for target applications that will be installed on one or more target devices by selecting the child associated with that target device 514A and 514B. For example, the parent user can enter identification information, such as the names of the parent or child associated with that device, and information necessary for notifications to be sent to the monitoring devices, such as email addresses or mobile device telephone numbers. The monitoring application can control the mobile devices to perform operations that are required, which can be managed by the monitoring system.

The monitoring application may enable the parent user to select an avatar, photo or other image to be associated with the parent monitoring devices and the child target devices via the monitoring application. An avatar, photo or other image may be selected at a later time or removed or replaced by the parent user via the monitoring application.

Once the setup information for each license is entered, a notification can then be sent to via email or message (e.g., text message or other mobile messaging service) to the mobile devices with a notification to install the application (either the monitoring application for a monitoring device or the target application for a target device) and set a password, as shown in block 308 of FIG. 3. The parent user can then download and install the application, set a password, and register the devices with the monitoring system, as shown in block 310 of FIG. 3. For example, the parent would enter information for each child's target device such that a link could be sent to the device for installation of the target application and monitoring settings could subsequently be sent to the device by the monitoring system.

In an example installation, the target device can read a Quick Response (QR) code or use a link/URL sent via email or mobile messaging, to access a certificate, and to confirm registration of the target device with the monitoring system. When the certificate is downloaded and installed, the monitoring system can push transmission or delivery of the target application, such that an alert is shown on the target device to install the target application. The target application can be then be automatically installed on the target mobile device of the child or can be installed by the parent. The target application will be configured upon installation to have access to digital images associated with the target device. For example, the target application can acquire permissions to access digital images, as well as location services and push notifications, on the target device.

The monitoring system can control target devices that have the target application installed and monitor information from these devices. The external server stores digital images, and possibly other data, from the target devices. The external server can receive the digital images and other information via the target application or via the monitoring system 230. The external server can be a third party external server or an external server controlled by the monitoring system. A security layer can control access to information of users of the both the monitoring application and the target application.

An enterprise account can be used to generate a certificate that will allow the monitoring system to manage the monitoring and target devices. For example, the monitoring and target devices can be enrolled by generating and installing a monitoring system profile, binding the devices to the monitoring system, sending monitoring system push notifications to the devices such that the devices connect to the monitoring system, and then executing commands to the devices.

As shown in the mobile device screen capture of FIG. 5C, the parent user can select monitoring settings through an account interface 500C for each target device, where the user can select or deselect nudity recognition 516, location tracking 518, application (app) activity tracking 520, and Internet activity tracking 522. The monitoring system then receives the parent's selection of nudity recognition, location, application activity, and Internet activity settings for each target device from the montoring application on the monitoring device, as shown in block 312 of FIG. 3.

Also on the account interface 500C of FIG. 5C, the monitoring application allows the parent user to select or deselect facial recognition 524, and select sample photographs of the child user obtained from the target device for use in facial recognition 526. The monitoring server receives the parent's facial recognition selections from the monitoring application on the monitoring device, as shown in block 314 of FIG. 3.

The monitoring system then sends the monitoring settings to the target application on one or more the target devices, as shown in block 316. The target application downloads the monitoring settings or configurations with no intervention from the user of the target device. The target application runs silently in the background such that the child user is unaware of its presence on the target device. Target device information, including digital images on the target device, application usage information, Internet usage information, and/or location information are obtained from the target device via the target application and synchronized with the monitoring server based on analysis by the target application according to the monitoring settings selected by the parent via the monitoring application. The monitoring system can then receive target device information from the target device, as shown in block 318.

The target application can have multiple methods of synchronizing and analyzing digital images and other information on the target device. The target application can monitor the location of the target device in foreground/background, analyze digital images on the target device for nudity and/or facial recognition, and send digital images to an external storage device. For example, location information updates can be obtained while the target application is running in the background. Via a background fetch, the target application can regularly download/upload and process small amounts of content from the network. For example, the target application can uploading target device information, including changes in the digital images, Internet usage, application usage, and location information, and download monitoring settings, such as facial recognition information and parameters for monitoring location information, Internet usage, and application usage. The amount of content uploaded/downloaded at a time can be kept small so as not to otherwise impair or slow the performance of the target device. The target application can identify when there is a change in the digital image library on the target device and report the changes to the monitoring system. Remote messages can be sent to the target application to perform an operation, such as performing a search based on facial recognition information or nudity or uploading other target device information. These methods can be used in combination such that the monitoring application will continue to have updated information from the target application.

Information sent from and to the target device and the monitoring device can pass through a security layer such that the information cannot be intercepted by unauthorized devices. The security layer can be on the target device, on the monitoring system, on the monitoring server, or can be at some other location on the Internet. For example, each user of the monitoring application can have a unique security token to access information from each target device. A Secure Sockets Layer (SSL) certificate can be required to be passed in association with the exchange of information so that the information cannot be stolen.

Figures 6A, 6B:
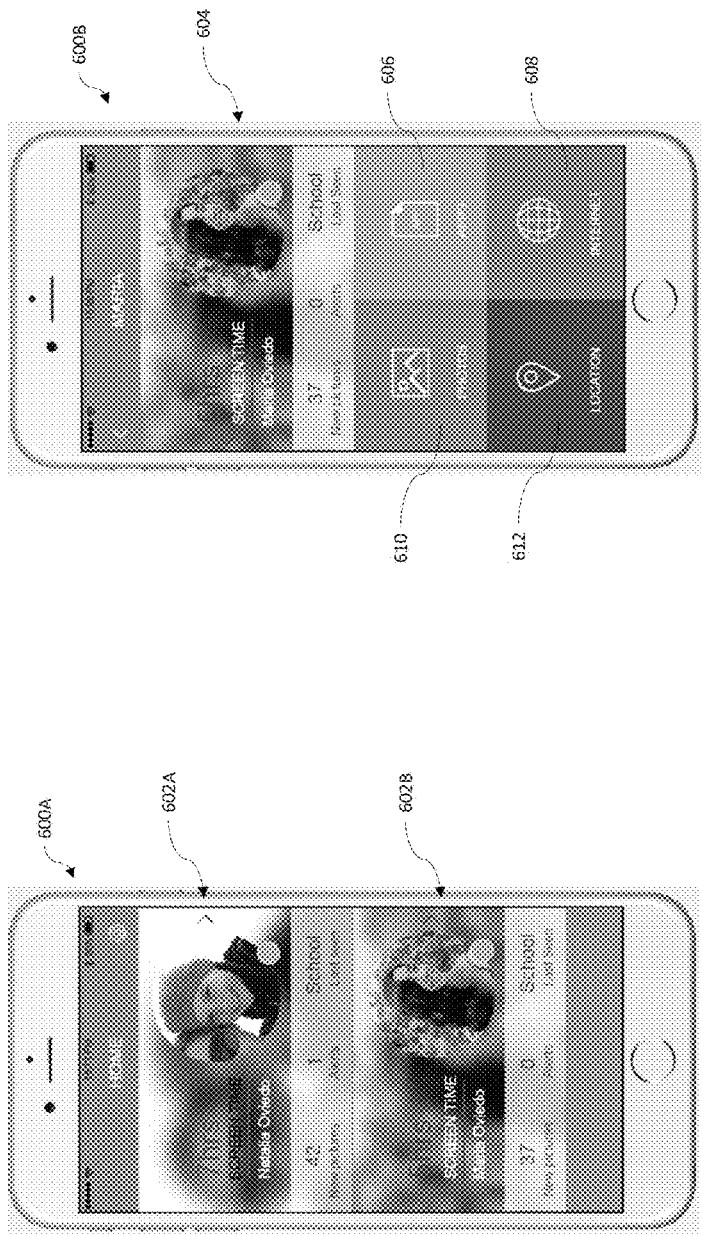
FIG. 6A is a mobile device screen capture showing a home screen interface of a monitoring application.
FIG. 6B is a mobile device screen capture showing a target device information interface of a monitoring application.

Once the parent has completed the set up process on the monitoring device and on the target device or devices, the parent can then monitor use of the target devices, as shown in block 320. As shown in the mobile device screen capture of FIG. 6A, a home interface 600A of the monitoring application allows the parent user to see the target devices and associated information 602A and 602B at a glance, and select one of the target devices to view more detailed target device information. The monitoring application can retrieve target device information from the monitoring system. For example, the home screen 600A can show screen time (e.g., total usage time of the mobile device over a certain period), a number of new pictures acquired, a number of alerts (e.g., alerts regarding facial recognition or nudity detection), and/or the last location of the target device.

The parent can then use the monitoring application to view detailed information about a selected target device, such as digital image information, application usage, location information, and/or Internet usage, as shown in block 322 of FIG. 3. As shown in the mobile device screen capture of FIG. 6B, the parent user can use the monitoring application to view detailed information about the target device from a target device information interface 600B, such as screen time 604, application (app) activity 606, Internet activity 608, digital images (e.g., photographs and videos)

610, and location information 612. The monitoring application can request updated target device information from the monitoring system. The monitoring system can then send updated target device information to the monitoring application on the monitoring device, as show in block 324.

Figures 7A, 7B:
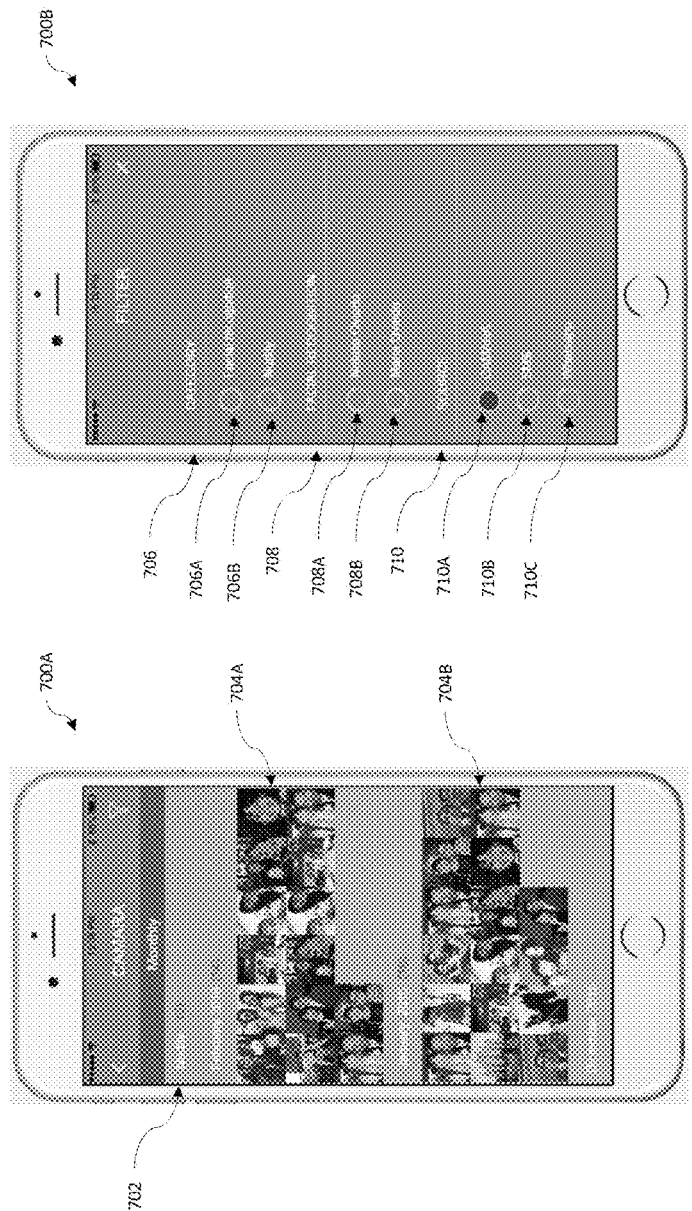
FIG. 7A is a mobile device screen capture showing a target device digital image information interface of a monitoring application.
FIG. 7B is a mobile device screen capture showing a target device digital image information filtering interface of a monitoring application.

As shown in the mobile device screen capture of FIG. 7A, the monitoring application provides the parent user the option to see representations of all the digital images, e.g., thumbnails of the digital images, from the selected target device that have been synchronized via the monitoring system based on the parent user's selections in a digital image interface 700A. The digital images can be organized by type, such as digital images depicting nudity 702 or that correspond to facial recognition settings, or by date, such as by month 704A and 704B. Processing and categorization can be performed on by the monitoring system and then this meat data can be sent to the monitoring application. The parent user can select one of the thumbnail to view the digital image at full-size. The digital image can be shown at its original resolution or at a suitable lower resolution to save memory space.

As shown in the mobile device screen capture of FIG. 7B, the monitoring application provides the parent user the option to filter the digital images in a digital image filter interface 700B, such that certain digital images can be efficiently located. For example, the user can filter by categories 706, including sorting by facial recognition 706A and nudity 706B; facial recognition 708 to identify particular individuals 708A and 708B indicated by the user in the settings; or digital image source 710, including digital images taken by the target device camera 710A, digital images sent via SMS or text message 710B, or digital images received via an application 710C (e.g., WHATSAPP or SNAPCHAT). The filtered information can then be displayed, as shown in block 326 of FIG. 3.

Figure 8B:
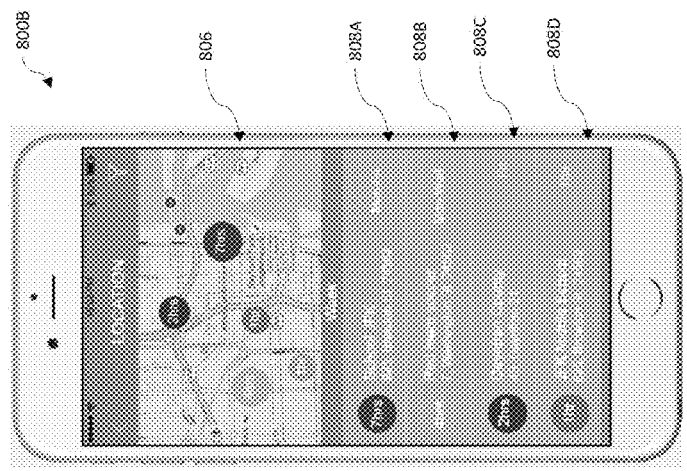
FIG. 8B is a mobile device screen capture showing a target device location information interface.
Figure 8A:
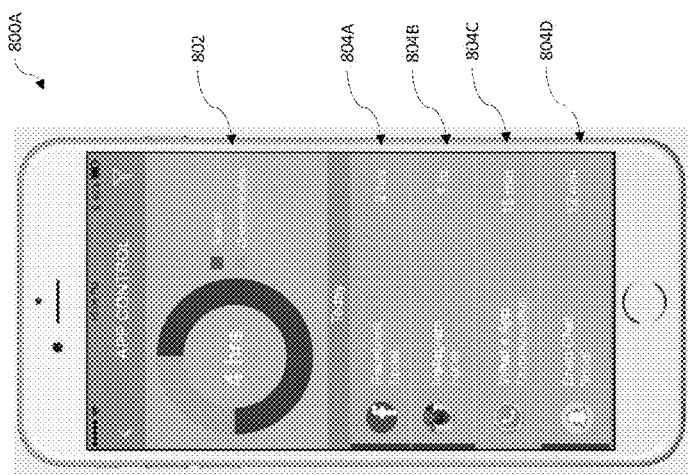
FIG. 8A is a mobile device screen capture showing a target device application usage information interface of a monitoring application.

As shown in the mobile device screen capture of FIG. 8A, the monitoring application provides the parent user the option to review the periods of usage of applications on the target device in an application usage information interface 800A. In an example, application usage information can be shown by category of application 802, such as social applications, communication applications, and games. Application usage information can also be shown by individual application 804A, 804B, 804C, and 804D. The user can filter the information by specific application or category of application.

In an Internet usage information screen, the monitoring application provides the parent user the option to see Internet history data, such as websites that have been viewed on the target device. The internet usage information can also include the period of viewing of the websites. The monitoring application provides the parent user the option of filtering the Internet history data by particular website or category of website, such as social, videos, e-commerce, and entertainment.

As shown in the mobile device screen capture of FIG. 8B, the monitoring application provides the parent user the option to see the target device's current location and previous locations in a location information interface 800B. For example, previous locations where the target device has been for a certain period (e.g., from 15 minutes to one hour) could be shown to limit the list of previous locations to relevant locations and exclude locations during transit. The location information, including duration at a location over a certain period, could be shown on a map 806 or in a list 808A, 808B, 808C, and 808D.

A location information filter interface provided by the monitoring application can permit the user to filter the location information. For example, the user can select to filter the location information for a particular time period, such as current location, location information for a day, or location for a week. The user can also select a specific time of the day to update the location of the target device.

The monitoring system can also send an alert to the parent via the parent application in response to detection of a condition selected in the settings by the parent user, as shown in block 328. For example, an alert can be sent to the monitoring application in response to detection of nudity or facial recognition in a digital image on a target device, where the alert is shown on the monitoring device though the monitoring application and/or as a system alert on the monitoring device. The parent user can optionally select certain locations, applications, or websites, in the settings, and alerts can be sent if these are detected. The parent user could also select to receive alerts via email or mobile messaging or on the device via system alerts.

The parent user could return to the settings screen on the monitoring application to review and/or update the user's information and review the licenses that are associated with the user's account. The user could also navigate to an account screen for each target device to review and/or update information and settings for that target device. For example, the user could choose to modify the monitoring conducted, such as by selecting or deselecting location monitoring or facial recognition for the particular target device in the monitoring application.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention claimed.

It is claimed:

1. A method for monitoring digital images on mobile devices comprising:
   receiving a designation of a target device and monitoring settings for the target device via a monitoring application on a monitoring device;
   sending the monitoring settings to a target application on the target device;
   receiving from the target application target device information based on the monitoring settings, the target device information comprising digital image information; and
   sending the target device information to the monitoring device, wherein the digital image information comprises representations of digital images on the target device and the representations are organized by image types, wherein the image types comprise an image type depicting nudity and an image type that corresponds to a facial recognition setting.

2. The method of claim 1 further comprising:
   sending a notification to the target device to prompt installation of the target application on the target device; and
   receiving a notification from the target device that the target application has been installed.

3. The method of claim 1 further comprising:
   causing the representations of the digital images on the target device to be sent from an external source to the monitoring device.

4. The method of claim 1, wherein the monitoring settings comprise facial recognition information based on a face image sample selected via the monitoring application.

5. The method of claim 4 further comprising sending an alert to the monitoring device in response to recognition of a face in the digital image information based on the facial recognition information.

6. The method of claim 1 further comprising sending an alert to the monitoring application in response to detection of nudity in the digital image information.

7. The method of claim 1, wherein the target device information further comprises application usage information, the application usage information indicating a period of use of an application on the target device.

8. The method of claim 1, wherein the target device information further comprises location information, the location information indicating a location of the target device during a period.

9. The method of claim 1, wherein the target device information further comprises Internet usage information, the Internet usage information indicating a period of viewing an Internet website on the target device.

10. A server computer having instructions stored thereon which when executed cause the server to perform actions comprising:
   receiving a designation of a target device and monitoring settings for the target device via a monitoring application on a monitoring device;
   sending the monitoring settings to a target application on the target device;
   receiving from the target application target device information based on the monitoring settings, the target device information comprising digital image information; and
   sending the target device information to the monitoring device, wherein the digital image information comprises representations of digital images on the target device and the representations are organized by image types, wherein the image types comprise an image type depicting nudity and an image type that corresponds to a facial recognition setting.

11. The server computer of claim 10 having further instructions stored thereon which when executed cause the server computer to perform additional actions comprising:
   sending a notification to the target device to prompt installation of the target application on the target device; and
   receiving a notification from the target device that the target application has been installed.

12. The server computer of claim 10 having further instructions stored thereon which when executed cause the server computer to perform an additional action comprising causing the representations of the digital images on the target device to be sent from an external source to the monitoring device.

13. The server computer of claim 10, wherein the monitoring settings comprise facial recognition information based on a face image sample selected via the monitoring application.

14. The server computer of claim 13 having further instructions stored thereon which when executed cause the server computer to perform an additional action comprising sending an alert to the monitoring device in response to recognition of a face in the digital image information based on the facial recognition information.

15. The server computer of claim 10 having further instructions stored thereon which when executed cause the server computer to perform an additional action comprising sending an alert to the monitoring application in response to detection of nudity in the digital image information.

16. The server computer of claim 10, wherein the target device information further comprises application usage information, the application usage information indicating a period of use of an application on the target device.

17. The server computer of claim 10, wherein the target device information further comprises location information, the location information indicating a location of the target device during a period.

18. The server computer of claim 10, wherein the target device information further comprises Internet usage information, the Internet usage information indicating a period of viewing an Internet website on the target device.

* * * * *